(12) United States Patent
Li et al.

(10) Patent No.: US 8,806,206 B2
(45) Date of Patent: Aug. 12, 2014

(54) COOPERATION METHOD AND SYSTEM OF HARDWARE SECURE UNITS, AND APPLICATION DEVICE

(75) Inventors: Xizhe Li, Beijing (CN); Hongping Tian, Beijing (CN); Wei Xie, Beijing (CN); Yun Gu, Beijing (CN); Xingzhong Mao, Beijing (CN); Chentao Yu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 594 days.

(21) Appl. No.: 12/340,206

(22) Filed: Dec. 19, 2008

(65) Prior Publication Data

US 2009/0254749 A1  Oct. 8, 2009

(30) Foreign Application Priority Data

Dec. 19, 2007 (CN) .......................... 2007 1 0179904

(51) Int. Cl.
*G06F 21/34* (2013.01)
(52) U.S. Cl.
CPC ...................................... *G06F 21/34* (2013.01)
USPC ............................ 713/169; 713/151; 713/164
(58) Field of Classification Search
USPC ......................................................... 713/169
See application file for complete search history.

(56) References Cited

U.S. PATENT DOCUMENTS

| 6,772,331 | B1 * | 8/2004 | Hind et al. | 713/151 |
| 2005/0039016 | A1 * | 2/2005 | Aissi et al. | 713/176 |
| 2005/0235141 | A1 * | 10/2005 | Ibrahim et al. | 713/164 |
| 2005/0289343 | A1 * | 12/2005 | Tahan | 713/169 |
| 2006/0090070 | A1 * | 4/2006 | Bade et al. | 713/164 |

FOREIGN PATENT DOCUMENTS

CN  1351789 A  5/2002

OTHER PUBLICATIONS

Xian, H., Feng, D.: Protecting mobile agents' data using trusted computing technology. Journal of Communication and Computer 4(3), 44-51 (2007).*

* cited by examiner

*Primary Examiner* — Carl Colin
*Assistant Examiner* — Syed Zaidi
(74) *Attorney, Agent, or Firm* — Kinney & Lange, P.A.

(57) ABSTRACT

The present invention provides a cooperation method of a mobile hardware secure unit and a fixed hardware secure unit, comprising: providing user's identification information of a mobile hardware secure unit; providing platform's identification information of a computer-based or other-device-based fixed hardware secure unit; establishing a bidirectional communication pipe between the mobile and fixed hardware secure unit; and binding the mobile and fixed hardware secure units through interaction of the user's identification information and the platform's identification information. The present invention further provides a cooperation system of a mobile hardware secure unit and a fixed hardware secure unit as well as a computer device, with which the security solution based on a fixed hardware secure unit can be combined with a mobile hardware secure unit securing a user's identity.

8 Claims, 4 Drawing Sheets

COOPERATION METHOD AND SYSTEM OF HARDWARE SECURE UNITS, AND APPLICATION DEVICE

BACKGROUND OF THE INVENTION

1. Field of Invention

The present invention relates to a hardware secure system, and in particular to cooperation method and system of fixed and mobile hardware secure units as well as a computer device using the fixed hardware secure unit.

2. Description of Prior Art

Current computers and other devices are each provided with an internal secure chip to guarantee their own security. For the secure chip, a platform certificate is loaded for providing platform identification to the outside. When a computer or other device communicates with a third party device, the platform certificate inside the secure chip can provide the third party device with the identification of the computer or other device.

The existing hardware secure chip solution based on computer or other device can guarantee security for the platform. Unfortunately, since the secure chip is fixed on the PC or other device and difficult to move, the hardware secure chip solution based on computer or other device can only be implemented by a designated machine, causing inconvenience in mobile use by a user.

For the conventional USB Keys and smart cards, their certificates and keys are placed within their own secure chips, each of which acts as a black box for providing functions of identity authentication and cryptography to the outside. The USB Key and smart card are used as a user's ID in a typical online bank application. In the USB Key, there is a secure chip which requires authentication from a bank or a server. An electronic certificate issued by the service is loaded safely to the USB Key, and the electronic certificate contains a key used in signature. At the stage of connecting to the bank or the service, the USB Key user's identity must be verified by means of password or any other authentication practice like finger print, to gain the right to use the key. When the user submits to the server his or her data such as "transfer XX dollars to XX account", the information must be signed with the electronic certificate of the USB Key, as an important evidence in confirming the user's operation. Meanwhile, the secure chip within the USB Key can also generate a user key. Data encrypted with the user key can be decrypted only with the key authorized by the user.

Two defects exist in the current solution of USB Key or smart card identifying a user.

1. The USB Key or smart card solution is responsible for only the user's identity other than security of the overall operating environment. Inherently, the solution cannot avoid or prevent a hacker program running in the computer from stealing the password of the USB Key or smart card. The user's identity cannot be secured after the USB Key or smart card is lost or the password is stolen.
2. The USB Key or smart card solution generally uses a password of several enterable characters to verify the user's identity. This is the weakest security factor in the overall secure system and susceptible to some violent attack.

SUMMARY OF THE INVENTION

The object of the present invention is to provide cooperation method and system of fixed and mobile hardware secure units, with which the security solution based on a fixed hardware secure unit can be combined with a mobile hardware secure unit securing a user's identity.

The present invention provides a cooperation method of a mobile hardware secure unit and a fixed hardware secure unit, comprising:

providing user's identification information of a mobile hardware secure unit;

providing platform's identification information of a computer-based or other-device-based fixed hardware secure unit;

establishing a bidirectional communication pipe between the mobile and fixed hardware secure unit; and binding the mobile and fixed hardware secure units through interaction of the user's identification information and the platform's identification information.

Preferably, the bidirectional communication pipe is established between the mobile and fixed hardware secure units by means of key negotiation or public key exchange.

Preferably, the bi-directional communication pipe is updated or abolished by the mobile and/or fixed hardware secure units.

Preferably, the interaction of unique identification information comprises:

sending the user's identification information of the mobile hardware secure unit to the fixed hardware secure unit which in turn recognizes and records the user's identification information;

sending the platform's identification information of the fixed hardware secure unit to the mobile hardware secure unit which in turn recognizes and records the platform's identification information.

Preferably, the interaction of unique identification information is performed after the user's identification information of the mobile hardware secure unit and/or the platform's identification information of the fixed hardware secure unit undergoes cryptography processing.

Preferably, the mobile and fixed hardware secure units perform a secondary encryption on information to be transmitted.

Preferably, the mobile and fixed hardware secure units perform their secondary encryption on plaintext to be transmitted;

the mobile and fixed hardware secure units perform their secondary signing on the signature which represents identity information and is to be transmitted.

Preferably, after the step of binding, the method further comprises:

registering by each of the mobile and fixed hardware secure units to a server, which confirms the binding relationship between the mobile and fixed hardware secure units.

Preferably, the registration of the mobile and fixed hardware secure units to the server comprises:

the mobile hardware secure unit packing information to be registered with the server and transmitting it to the fixed hardware secure unit;

the fixed hardware secure unit packing its own registration information together with the packed registration information of the mobile hardware secure unit, and transmitting the packed information to the server.

Preferably, the registration of the mobile and fixed hardware secure units to the server comprises:

the mobile hardware secure unit packing information to be registered with the server and transmitting it to the server;

the fixed hardware secure unit packing its own registration information and the user's identification information of the mobile hardware secure unit together and transmitting the packed information to the server.

Preferably, while sending a service request to the server, the mobile and fixed hardware secure units signs together under the binding relationship to present the platform's identity and the user's identity at the same time.

Preferably, the mobile and fixed hardware secure units perform a secondary encryption on content to be sent to the server.

The present invention provides a cooperation system of a mobile hardware secure unit and a fixed hardware secure unit, comprising a mobile hardware secure unit, a fixed hardware secure unit, a communication pipe establishment unit and a binding unit, wherein the mobile hardware secure unit is used for representing a user's identity;

the fixed hardware secure unit is computer-based or other-device-based and for representing a platform's identity;

the communication pipe establishment unit is used for establishing a bidirectional communication pipe between the mobile and fixed hardware secure unit; and the binding unit is used for binding the mobile and fixed hardware secure units together through interaction of unique identification information.

Preferably, the cooperation system further comprises a condition setting unit and/or an update unit and/or an abolishment unit, wherein the condition setting unit is used for setting a condition for updating or abolishing the bidirectional communication pipe;

the update unit is used for updating the bidirectional communication pipe or updating the bidirectional communication pipe according to the condition set by the condition setting unit;

the abolishment unit is used for abolishing the bidirectional communication pipe or abolishing the bidirectional communication pipe according to the condition set by the condition setting unit.

Preferably, the cooperation system further comprises a processing unit for performing cryptography processing on the unique identification information of the mobile hardware secure unit and/or the unique identification information of the fixed hardware secure unit.

The present invention provides a computer device comprising a fixed hardware secure unit firmed inside, the fixed hardware secure unit is loaded with a platform certificate for representing a platform's identity, wherein a bidirectional communication pipe is established between the fixed hardware secure unit and a mobile hardware secure unit representing a user's identity;

the mobile and fixed hardware secure units are bound together through interaction of unique identification information.

Preferably, the computer device further comprises a condition setting unit and/or an update unit and/or an abolishment unit, wherein the condition setting unit is used for setting a condition for updating or abolishing the bidirectional communication pipe;

the update unit is used for updating the bidirectional communication pipe or updating the bidirectional communication pipe according to the condition set by the condition setting unit;

the abolishment unit is used for abolishing the bidirectional communication pipe or abolishing the bidirectional communication pipe according to the condition set by the condition setting unit.

Preferably, the computer device further comprises a processing unit for performing cryptography processing on the unique identification information of the mobile hardware secure unit and/or the unique identification information of the fixed hardware secure unit.

In the cooperation method of the mobile and fixed hardware secure units of the above embodiment, a communication pipe is established between the mobile and fixed hardware secure units to enable secure file transmission between the mobile and fixed hardware secure units. Also, the mobile and fixed hardware secure units are bound with each other, and if data is sent to a third party after the binding of the mobile and fixed hardware secure units, the data can be obtained only after both the mobile and fixed hardware secure units performs decryption. In this way, the cooperation method of the above embodiment solves the problem in the prior art that the fixed hardware secure unit based on computer or other device cannot be moved easily and some machine must be specified, causing inconvenience in mobile usage. Further, in the cooperation method, the security solution based on a fixed hardware secure unit can be combined with a mobile hardware secure unit securing a user's identity, thereby improving security of data transmission.

DETAILED DESCRIPTION OF PREFERRED EMBODIMENTS

The present invention provides a method of cooperation between fixed and mobile hardware secure units, with which the security solution based on a fixed hardware secure unit can be combined with a mobile hardware secure unit securing a user's identity.

Figure 1:
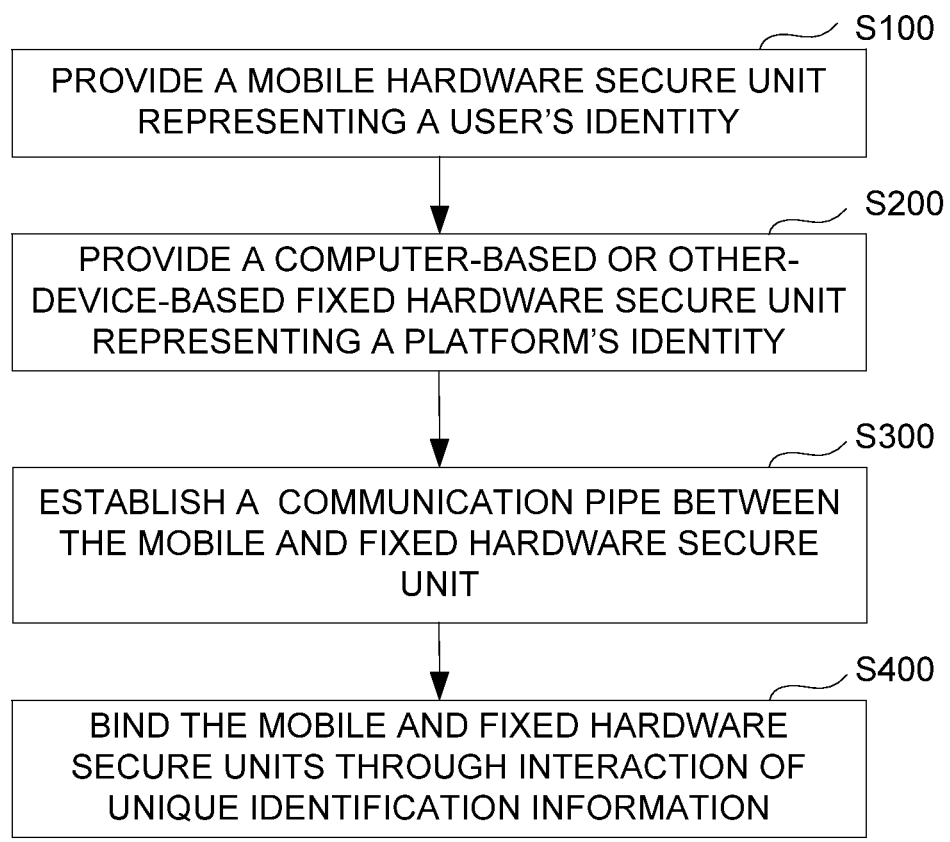
FIG. 1 is a flowchart of the first embodiment of the cooperation method in the present invention.

Referring to FIG. 1, a flowchart of the first embodiment of the cooperation method in the present invention is shown.

The first embodiment of the cooperation method in the present invention comprises the following steps.

S100, provide a mobile hardware secure unit representing a user's identity.

The mobile hardware secure unit can be an identification secure chip in USB Key or a smart card with identity authorized by a server.

In the USB Key or the smart card, there is an identification (ID) secure chip which can be authenticated by the server through the following process: the identification secure chip downloads an electronic certificate which is issued by the server and contains a key used in signature; the user's identity is verified by means of password or any other authentication practice like finger print so that the user can gain the right to use the key.

When the user submits to the server his or her data, the data must be signed with the electronic certificate, and the signature acts as an important evidence for confirming the user's operation.

The Identification secure chip can be used as the mobile hardware secure unit.

The Identification secure chip within the USB Key can generate a user key. Data encrypted with the user key can be decrypted only with the key authorized by the user.

S200, provide a computer-based or other-device-based fixed hardware secure unit representing the identity of the platform.

A platform Identification secure chip is provided within the computer or other device. The platform Identification secure chip is loaded with a platform certificate and responsible for providing the ID of the platform to the outside. The platform Identification secure chip can be used as the fixed hardware secure unit.

S300, the mobile and fixed hardware secure units create a bi-directional communication pipe.

The mobile and fixed hardware secure units can create the bi-directional communication pipe by means of public key exchange.

So-called public key exchange is giving the public key Ka of the fixed hardware secure unit to the mobile hardware secure unit, giving the public key Kb of the mobile hardware secure unit to the fixed hardware secure unit, and the mobile and fixed hardware secure units each hold their own private keys Ka', Kb'.

Figure 2:
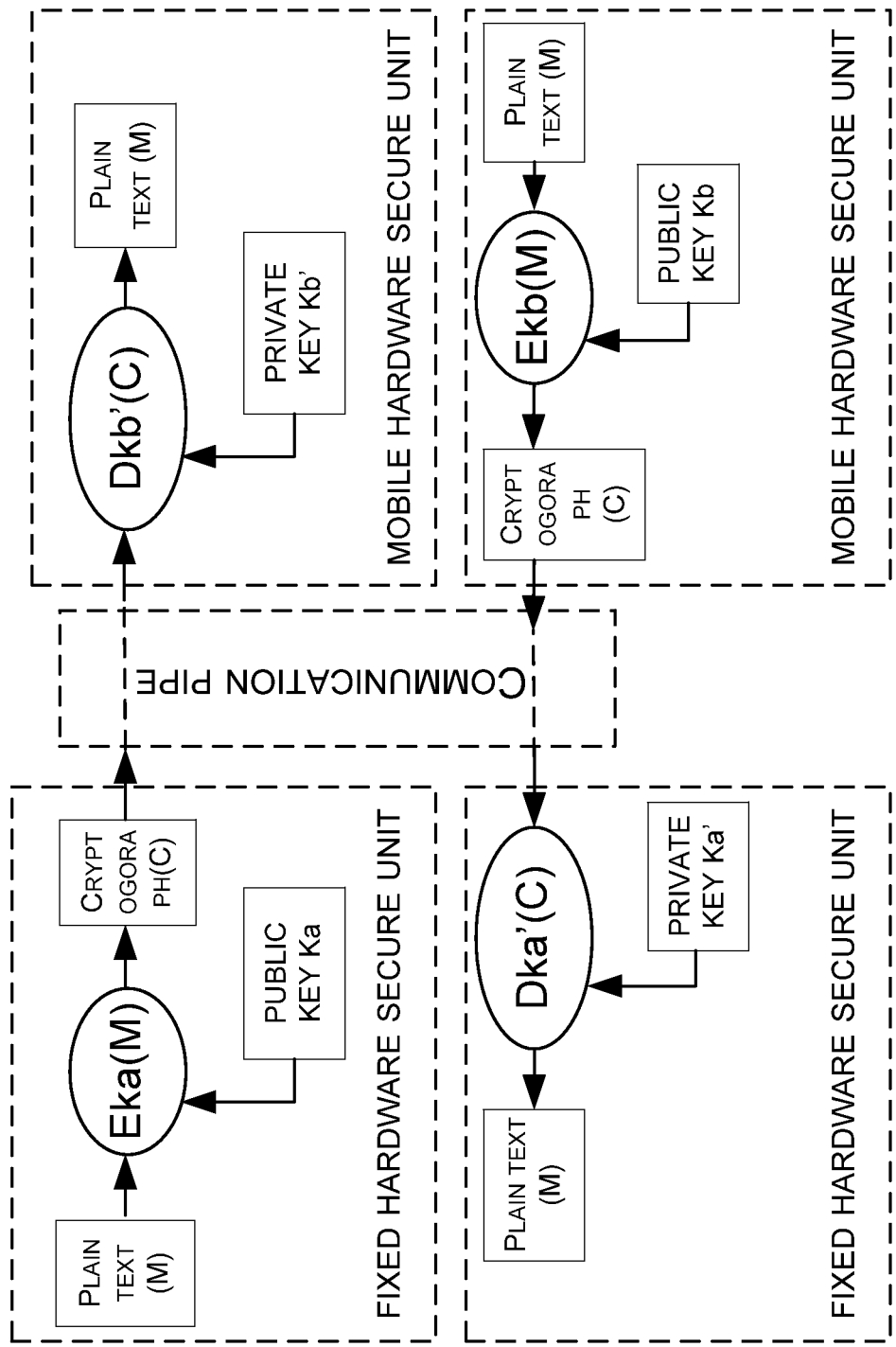
FIG. 2 is a schematic block diagram of the communication pipe in the present invention.

Referring to FIG. 2, a schematic block diagram of the communication pipe in the present invention is shown. The establishing procedure is the "public key exchange" process.

The fixed hardware secure unit encrypts plaintext M to be transmitted with its public key Ka to generate cryptograph C. Then, the fixed hardware secure unit transmits the cryptograph C to the mobile hardware secure unit, which decrypts the cryptograph C with its private key Kb' to obtain the plaintext M. As such, a unidirectional communication pipe from the fixed hardware secure unit to the mobile hardware secure unit is established.

The mobile hardware secure unit encrypts plaintext M to be transmitted with its public key Ka to generate cryptograph C. Then, the mobile hardware secure unit transmits the cryptograph C to the fixed hardware secure unit, which decrypts the cryptograph C with its private key Ka' to obtain the plaintext M. As such, a unidirectional communication pipe from the mobile hardware secure unit to the fixed hardware secure unit is established Then, the unidirectional communication pipe from the fixed hardware secure unit to the mobile hardware secure unit and the unidirectional communication pipe from the mobile hardware secure unit to the fixed hardware secure unit collectively form the bidirectional communication pipe between the fixed and mobile hardware secure units.

The above establishment of the bidirectional communication pipe is performed by exchanging public keys between the mobile and fixed hardware secure units.

The mobile and fixed hardware secure units can also establish the bidirectional communication pipe by means of key negotiation.

In an insecure environment, a key system is usually adopted to encrypt information to be transmitted for meeting requirements of security and integrity. Also, a corresponding decryption key is required at the information receipt side for decrypting the encrypted information.

The conventional key system is called single key system, which is characterized in that the encryption and decryption keys can mutually derive the sender and recipient of information.

In such single key system, a member can encrypt information with a shared key and deliver the encrypted information to another member. Unfortunately, a key session is difficult to establish between the members if they are far away from each other.

There are two approaches to establish a key session, namely, key distribution and key negotiation.

Key distribution is a mechanism by which a member can choose to deliver a key to another member in a secured manner.

Key negotiation requires the members participating in a session to set up a public key together. In a network environment, key negotiation is more advantage than key distribution, since the participants can set up a key randomly without any mechanism for key distribution and management.

Group key agreement is a method based on distributed concept and characterized in that: 1) more than one member of a group participates in key generation, 2) the key for the group is decided collectively by parameters provided from each member and the key generation algorithm, 3) none of the group members can determine the key in advance.

Several popular methods of group key agreement and distribution have been known, including CKD (Centralized Group Key Distribution), BD (Burmester-Desmedt), STR (Steer et al.), GDH (Group Diffie-Hellman) and TGDH (Tree-Based Group Diffie-Hellman).

In 1976, Whit Diffie and Martin Hellman proposed Diffie-Hellman (abbreviated as DH) algorithm, which is a protocol of key exchange between two parties and used for secure negotiation of a shared key between two peer-to-peer entities. The DH algorithm in nature is a protocol for key negotiation by both communication parties. The security of the DH algorithm is based on difficulty with which a discrete logarithm is computed over a limited domain.

The details of the Diffie-Hellman key exchange protocol are given as follows. First, both parties, Alice and Bob, agree on two large integers n, g, 1<g<n. The two integers are not necessary to be kept secret. Then, the following process is performed:

1) Alice chooses a large integer x (kept secret) randomly and calculates X=gx mod n;
2) Bob chooses a large integer y (kept secret) randomly and calculates Y=gy mod n;
3) Alice sends X to Bob, and Bob sends Y to Alice;
4) Alice calculates K=Yx mod n;
5) Bob calculates K=Xy mod n.

K is exactly the shared key.

A spy person, Oscar, can only spy on and obtain X and Y over the network, but cannot calculate x and y with the obtained X and Y. Thus, Oscar cannot calculate K=gxy mod n.

The communication pipe can be updated or abolished by any one of the mobile hardware secure unit and the fixed hardware secure unit. Also, the communication pipe can be updated or abolished together by both of the mobile hardware secure unit and the fixed hardware secure unit.

Update of the communication pipe: one of the mobile hardware secure unit and the fixed hardware secure unit sends a new key encrypted with the old encryption key to the other party via the communication pipe; then, communication is made with the new key; thus, the communication pipe is updated.

Abolishment of the communication pipe: the mobile hardware secure unit or the fixed hardware secure unit deletes the old key directly; thus, the communication pipe is abolished.

Further, the communication pipe can be updated or abolished according to, for example, a predetermined time period or a predetermined number of times by the mobile hardware secure unit or the fixed hardware secure unit. In such case, the communication pipe is updated or abolished when the predetermined time period has elapsed or data exchange has performed for the predetermined number of times.

When a bidirectional communication pipe is been establishing between the mobile hardware secure unit and the fixed hardware secure unit, the mobile hardware secure unit or the fixed hardware secure unit can set a valid time period of, for example, 1 hour for the bidirectional communication pipe. The bidirectional communication pipe will be abolished as soon as the period of 1 hour has elapsed.

When a bidirectional communication pipe is been establishing between the mobile hardware secure unit and the fixed hardware secure unit, the mobile hardware secure unit or the fixed hardware secure unit can set a valid number of times, for example, 100, for data exchange. The bidirectional communication pipe will be abolished as soon as data exchange has occurred for 100 times.

When a bidirectional communication pipe is been establishing between the mobile hardware secure unit and the fixed hardware secure unit, the mobile hardware secure unit or the fixed hardware secure unit can set an update time condition of, for example, 1 hour for the bidirectional communication pipe. The bidirectional communication pipe will be updated with predefined content as soon as the period of 1 hour has elapses, i.e., the update time condition has been met.

When a bidirectional communication pipe is been establishing between the mobile hardware secure unit and the fixed hardware secure unit, the mobile hardware secure unit or the fixed hardware secure unit can set the update condition as the number of times for data exchange. For example, the update condition can be set as 100 times for data exchange. The bidirectional communication pipe will be updated with predefined content as soon as data exchange has occurred for 100 times, i.e., the update condition has been met.

Further, the communication pipe can be updated or abolished according to, for example, a predetermined time period or a predetermined number of times set together by both of the mobile hardware secure unit and the fixed hardware secure unit. In such case, the communication pipe is updated or abolished when the predetermined time period has elapsed or data exchange has performed for the predetermined number of times.

The update or abolish condition set together by both of the mobile hardware secure unit and the fixed hardware secure unit can be a condition negotiated by both parties, or combination of a condition set by the mobile hardware secure unit and a further condition set by the fixed hardware secure unit. When the two conditions are both satisfied, the update or abolishment can be enabled.

S400, the mobile hardware secure unit and the fixed hardware secure unit are bound with each other through interaction of unique identification information.

Specifically, the interaction of unique identification information comprises: the unique identification information of the mobile hardware secure unit is sent to the fixed hardware secure unit, which in turn recognizes and records the unique identification information; meanwhile, the unique identification information of the fixed hardware secure unit is sent to the mobile hardware secure unit, which in turn recognizes and records the unique identification information. Such mutual recognition and recording process is exactly a process of creating a bond between the mobile hardware secure unit and the fixed hardware secure unit.

The interaction of unique identification information can be performed between the mobile hardware secure unit and the fixed hardware secure unit after the information undergoes cryptography processing. The content to be interacted can be a result from some cryptography processing, such as operations of hybridization, encryption, extending, HASH and HMAC. Then, the processing result is "exchanged" as basis of binding and recognition. Also, the information itself can be "exchanged" directly without any processing.

The interaction of unique Identification information can be performed between the mobile hardware secure unit and the fixed hardware secure unit after the information of both parties undergoes cryptography processing.

The mobile hardware secure unit and the fixed hardware secure unit can interact with each other via their unique identification information, such as certificate, key, ID, password, to achieve a mutual binding.

Every communication is required to be performed over the communication pipe after it is established, and the communication pipe is encrypted. As a result, the above binding process is actually a process of mutual identifying and recording. Both of the parties each remember the fixed unique identification information or HASH values of the information of the opposite party.

The binding between the mobile hardware secure unit and the fixed hardware secure unit can be queried or deleted.

The mobile hardware secure unit can query about whether there is binding between itself and the fixed hardware secure unit, by inputting the unique identification information or the HASH values of the information of the fixed hardware secure unit.

Meanwhile, the fixed hardware secure unit can query about whether there is binding between itself and the mobile hardware secure unit, by inputting the unique identification information or the HASH values of the information of the mobile hardware secure unit.

Deletion of the binding between the mobile hardware secure unit and the fixed hardware secure unit is that the mobile hardware secure unit or the fixed hardware secure unit deletes the unique identification information of the other parties.

The binding between the mobile hardware secure unit and the fixed hardware secure unit can be updated or abolished on certain condition of, for example, time period and number of times, to ensure security of the binding.

A valid time period of, for example, 1 hour, can be set for the binding between the mobile hardware secure unit and the fixed hardware secure unit. The binding will be abolished as soon as the period of 1 hour has elapses.

A valid number of times, for example, 100, for data exchange can be set for the binding between the mobile hardware secure unit and the fixed hardware secure unit. The binding will be abolished as soon as data exchange has occurred for 100 times.

An update time condition of, for example, 1 hour can be set for the binding between the mobile hardware secure unit and the fixed hardware secure unit. The binding will be updated with predefined content as soon as the period of 1 hour has elapses, i.e., the update time condition has been met.

The update condition of the binding between the mobile hardware secure unit and the fixed hardware secure unit can be set as the number of times for data exchange. For example, the update condition can be set as 100 times for data exchange. The binding will be updated with predefined content as soon as data exchange has occurred for 100 times, i.e., the update condition has been met.

The mobile and fixed hardware secure units can perform a secondary encryption on content to be transmitted to a third party.

The mobile and fixed hardware secure units can perform the secondary encryption on plaintext to be transmitted to a third party.

The mobile and fixed hardware secure units can perform secondary signing on the signature which represents identity information and is to be transmitted to a third party.

In the case of asymmetrical key, the mobile and fixed hardware secure units can perform second public key encryption on plaintext to be transmitted to a third party. The mobile and fixed hardware secure units can perform second private key encryption on the signature which represents identity information and is to be transmitted to a third party.

Important data like electronic certificate must be encrypted and decrypted twice by the mobile and fixed hardware secure units under the condition of a binding between the two parties. Alternatively, each of the mobile and fixed hardware secure units can encrypt some data individually and unrepeated, so as to complete the encryption for security enhancement.

The important data can be set or determined according to applications or as needed by the user.

The encryption and decryption keys for the important data should not be moved between the two parties in a binding relationship to further guarantee data security. On the other hand, these keys can be encrypted and then moved or stored. Keys other than the encryption and decryption keys for the important data can be moved and backed-up between the mobile and fixed hardware secure units.

A flag bit, such as "No" or "Yes", can be provided on a key to denote whether the key can be moved. The flag bit "No" on the key denotes immovability, and the flag bit "Yes" denotes movability.

The attribute of a key can be set by a creator (user or upper-level application) at the time of creation. If necessary, the attribute can be changed as needed.

In the cooperation method of the mobile and fixed hardware secure units of the above embodiment, a communication pipe is established between the mobile and fixed hardware secure units to enable secure file transmission between the mobile and fixed hardware secure units. Also, the mobile and fixed hardware secure units are bound with each other, and if data is sent to a third party after the binding of the mobile and fixed hardware secure units, the data can be obtained only after both the mobile and fixed hardware secure units performs decryption. In this way, the cooperation method of the above embodiment solves the problem in the prior art that the fixed hardware secure unit based on computer or other device cannot be moved easily and some machine must be specified, causing inconvenience in mobile usage. Further, in the cooperation method, the security solution based on a fixed hardware secure unit can be combined with a mobile hardware secure unit securing a user's identity, thereby improving security of data transmission.

Figure 3:
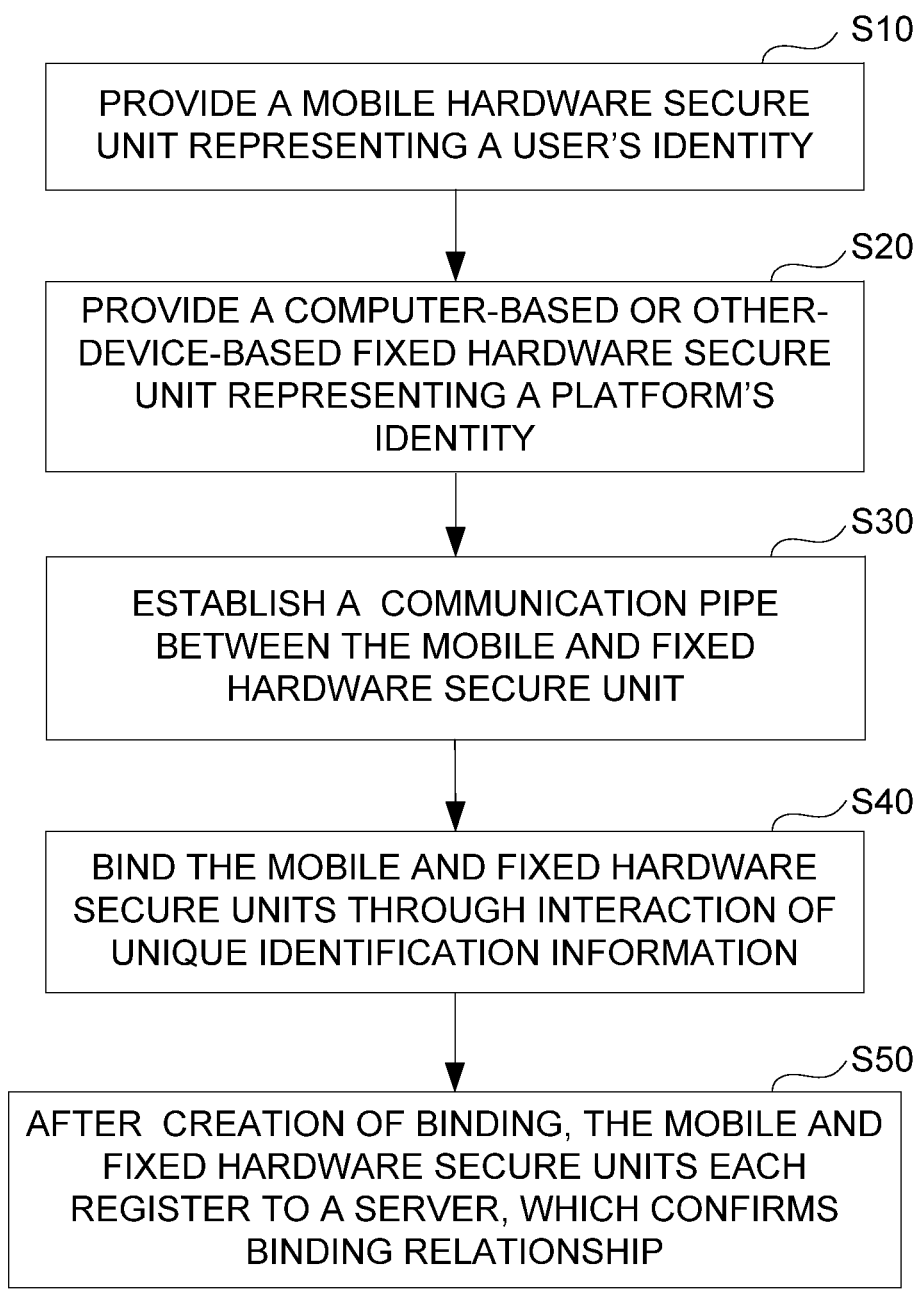
FIG. 3 is a flowchart of the second embodiment of the cooperation method in the present invention.

FIG. 3 is a flowchart of the second embodiment of the cooperation method in the present invention.

The cooperation method of mobile and fixed hardware secure units in the second embodiment comprises the following steps.

S10, provide a mobile hardware secure unit representing a user's identity.

The mobile hardware secure unit is one having an identity authorized by a server.

S20, provide a computer-based or other-device-based fixed hardware secure unit representing the identity of the platform.

A platform Identification secure chip is provided within the computer or other device. The platform Identification secure chip is loaded with a platform certificate and responsible for providing the ID of the platform to the outside. The platform Identification secure chip can be used as the fixed hardware secure unit.

S30, the mobile and fixed hardware secure units create a bidirectional communication pipe by means of key negotiation or public key exchange.

The mobile and fixed hardware secure units can create the communication pipe by means of public key exchange.

The mobile and fixed hardware secure units can create the communication pipe by means of key negotiation.

The communication pipe can be updated or abolished at any time or under some condition, such as certain time period or number of times, by the two parties, to guarantee security for transmission.

Update of the communication pipe: send a new key encrypted with an old key to the opposite party over the communication pipe and perform communication with the new key to update the communication pipe.

Abolishment of the communication pipe: delete the old key directly and thus abolish the communication pipe.

S40, the mobile hardware secure unit and the fixed hardware secure unit are bound with each other through interaction of unique identification information.

Specifically, the interaction of unique identification information comprises: the unique identification information of the mobile hardware secure unit is sent to the fixed hardware secure unit, which in turn recognizes and records the unique identification information; meanwhile, the unique identification information of the fixed hardware secure unit is sent to the mobile hardware secure unit, which in turn recognizes and records the unique identification information. Such mutual recognition and recording process is exactly a process of creating a bound between the mobile hardware secure unit and the fixed hardware secure unit.

The interaction of unique identification information can be performed between the mobile hardware secure unit and the fixed hardware secure unit after the information undergoes cryptography processing. The content to be interacted can be a result from some cryptography processing, such as operations of hybridization, encryption, extending, HASH and HMAC. Then, the processing result is "exchanged" as basis of binding and recognition. Also, the information itself can be "exchanged" directly without any processing.

The interaction of unique Identification information can be performed between the mobile hardware secure unit and the fixed hardware secure unit after the information of both parties undergoes cryptography processing.

The mobile hardware secure unit and the fixed hardware secure unit can interact with each other via their unique identification information, such as certificate, key, ID, password, to achieve a mutual binding.

Every communication is required to be performed over the communication pipe after it is established, and the communication pipe is encrypted. As a result, the above binding process is actually a process of mutual identifying and recording. Both of the parties each remember the fixed unique identification information or HASH values of the information of the opposite party.

The binding between the mobile hardware secure unit and the fixed hardware secure unit can be created, queried or deleted, or can be updated or abolished under some condition, such as certain time period or number of times, to guarantee security for the binding.

S50, after establishing the binding relationship, the mobile and fixed hardware secure units each register to the server, which confirms the binding relationship between the mobile and fixed hardware secure units.

The mobile and fixed hardware secure units can register to the server via the following two approaches.

The First Approach

First, the mobile hardware secure unit packs information to be registered with the server and transmits it to the fixed hardware secure unit.

The information can be securely transmitted from the mobile hardware secure unit to the fixed hardware secure unit, since there is binding between the mobile and fixed hardware secure units.

Then, the fixed hardware secure unit packs its own registration information together with the packed registration information of the mobile hardware secure unit, and transmits the packed information to the server.

The registration data packet received by the server contains the registration information of both the mobile and fixed hardware secure units. So, the server can confirm that there is secure binding relationship between the mobile and fixed hardware secure units.

The Second Approach

First, the mobile hardware secure unit packs information to be registered with the server and transmits it to the server.

The registration data packet received by the server from the mobile hardware secure unit contains the unique identification information of the mobile hardware secure unit.

Then, the fixed hardware secure unit packs its own registration information and the unique identification information of the mobile hardware secure unit together and transmits the packed information to the server.

The fixed hardware secure unit packs its own registration information and the unique identification information, such as ID, certificate or password, of the mobile hardware secure unit together and transmits the packed information to the server.

The registration data packet received by the server from the fixed hardware secure unit contains the registration information of the fixed hardware secure unit and the unique identification information of the mobile hardware secure unit. The server can compare the unique identification information with that contained in the registration data packet received by the server from the mobile hardware secure unit. If the two piece of information are consistent, the server can confirm that there is secure binding relationship between the mobile and fixed hardware secure units.

The mobile and fixed hardware secure units can submit their identity information or keys to the server at the same time as registration.

The identity information can be any information that enables the server to accurately identify the hardware secure units. For example, the identity information can be simply a public key used for signature verification or binding identification information or collection of these pieces of information.

When the user needs to present its identity to the server, the mobile and fixed hardware secure units are required to sign together under the binding relationship and present the identities of the platform and the user at the same time. Any of the two presentations is indispensible; otherwise, the server will reject any service.

While sending a service request to the server under the binding relationship, the mobile and fixed hardware secure units need to sign together under the binding relationship so as to present the identities of the platform and the user at the same time.

When the user submits to the server his or her data such as "transfer XX dollars to XX account", the information must be signed with the electronic certificate of the mobile hardware secure unit like USB Key. Also, the fixed hardware secure unit, such as TPM (Trusted Platform Module) on a computer, is needed for electronic certificate authentication or signature. After the signing of both of the mobile and fixed hardware secure units, the data is then transmitted to the server.

The mobile and fixed hardware secure units can perform a secondary encryption on content to be transmitted to the server.

The mobile and fixed hardware secure units can perform the secondary encryption on plaintext to be transmitted to the server.

The mobile and fixed hardware secure units can perform secondary signing on the signature which represents identity information and is to be transmitted to the server.

In the case of asymmetrical key, the mobile and fixed hardware secure units can perform second public key encryption on plaintext to be transmitted to the server. The mobile and fixed hardware secure units can perform second private key encryption on the signature which represents identity information and is to be transmitted to the server.

Important data like electronic certificate must be encrypted and decrypted twice by the mobile and fixed hardware secure units under the condition of a binding between the two parties. Alternatively, each of the mobile and fixed hardware secure units can encrypt some data individually and unrepeated, so as to complete the encryption for security enhancement.

The important data can be set or determined according to applications or as needed by the user.

The encryption and decryption keys for the important data should not be moved between the two parties in a binding relationship to further guarantee data security. On the other hand, these keys can be encrypted and then moved or stored. Keys other than the encryption and decryption keys for the important data can be moved and backupped between the mobile and fixed hardware secure units.

A flag bit, such as "No" or "Yes", can be provided on a key to denote whether the key can be moved. The flag bit "No" on the key denotes immovability, and the flag bit "Yes" denotes movability.

The attribute of a key can be set by a creator (user or upper-level application) at the time of creation. If necessary, the attribute can be changed as needed.

In the cooperation method of the mobile and fixed hardware secure units of the above embodiment, a communication pipe is established between the mobile and fixed hardware secure units to enable secure file transmission between the mobile and fixed hardware secure units. Also, the mobile and fixed hardware secure units are bound with each other. After the creation of such binding relationship, the mobile and fixed hardware secure units 11, 12 each register to the server and submit their identity information or key, respectively. and if data is sent to the server after the binding of the mobile and fixed hardware secure units, the data can be obtained only after both the mobile and fixed hardware secure units performs decryption, thereby improving security of data transmission.

The present invention provides a cooperation system of mobile and fixed hardware secure units, in which the security solution based on a fixed hardware secure unit can be combined with a mobile hardware secure unit securing a user's identity.

Figure 4:
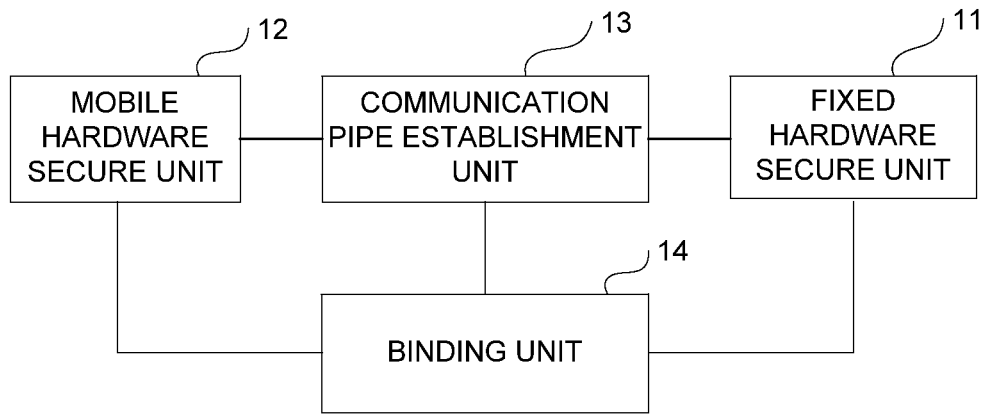
FIG. 4 is a flowchart of the first embodiment of the cooperation system in the present invention.

FIG. 4 is a flowchart of the first embodiment of the cooperation system in the present invention.

The first embodiment of the cooperation system in the present invention comprises a mobile hardware secure unit 11, a fixed hardware secure unit 12, a communication pipe establishment unit 13 and a binding unit 14.

The mobile hardware secure unit 11 is used for representing a user's identity.

The mobile hardware secure unit 11 can be one having an identity authorized by a server, such as a hardware secure chip inside USB Key or smart card.

The fixed hardware secure unit 12 is a computer-based or other-device-based fixed hardware secure unit representing the identity of the platform.

The fixed hardware secure unit 12 can be a platform Identification secure chip provided inside the computer or other device. The platform Identification secure chip is loaded with a platform certificate and responsible for providing the ID of the platform to the outside.

The communication pipe establishment unit 13 establishes a communication pipe between the mobile and fixed hardware secure units by means of key negotiation or public key exchange.

The communication pipe establishment unit 13 can establish a secure communication pipe between the mobile and fixed hardware secure units by means of public key exchange.

The communication pipe establishment unit 13 can establish a secure communication pipe between the mobile and fixed hardware secure units by means of key negotiation.

The communication pipe can be updated or abolished at any time or under some condition, such as certain time period or number of times, by the two parties, to guarantee security for transmission.

Update of the communication pipe: the communication pipe establishment unit 13 sends a new key encrypted with an old key to the opposite party over the communication pipe and then perform communication with the new key to update the communication pipe.

Abolishment of the communication pipe: the communication pipe establishment unit 13 deletes the old key directly and thus abolish the communication pipe.

The binding unit 14 is used to binding the mobile hardware secure unit and the fixed hardware secure unit through interaction of unique identification information between the two parties.

Specifically, the interaction of unique identification information comprises: the binding unit 14 controls the unique identification information of the mobile hardware secure unit 11 to be sent to the fixed hardware secure unit 12, which in turn recognizes and records the unique identification information; meanwhile, the binding unit 14 controls the unique identification information of the fixed hardware secure unit 12 to be sent to the mobile hardware secure unit 11, which in turn recognizes and records the unique identification information.

The binding unit 14 can control the interaction of unique identification information to be performed between the mobile hardware secure unit 11 and the fixed hardware secure unit 12 after the information undergoes cryptography processing. The content to be interacted can be a result from some cryptography processing, such as operations of hybridization, encryption, extending, HASH and HMAC. Then, the processing result is "exchanged" as basis of binding and recognition. Also, the information itself can be "exchanged" directly without any processing.

The binding unit 14 can control the interaction of unique Identification information to be performed between the mobile hardware secure unit 11 and the fixed hardware secure unit 12 after the information of both parties undergoes cryptography processing.

The mobile hardware secure unit 11 and the fixed hardware secure unit 12 can interact with each other via their unique identification information, such as certificate, key, ID, password, to achieve a mutual binding.

Every communication is required to be performed over the communication pipe after it is established, and the communication pipe is encrypted. As a result, the above binding process is actually a process of mutual identifying and recording. Both of the parties each remember the fixed unique identification information or HASH values of the information of the opposite party.

The binding between the mobile hardware secure unit 11 and the fixed hardware secure unit 12 can be created, queried or deleted, or can be updated or abolished under some condition, such as certain time period or number of times, to guarantee security for the binding.

In the cooperation system of the mobile and fixed hardware secure units of the above embodiment, a communication pipe is established by the communication pipe establishment unit 13 between the mobile and fixed hardware secure units 11, 12 to enable secure file transmission between the mobile and fixed hardware secure units. Also, the mobile and fixed hardware secure units 11, 12 are bound with each other by the binding unit 14, and if data is sent to a third party after the binding of the mobile and fixed hardware secure units 11, 12, the data can be obtained only after both the mobile and fixed hardware secure units 11, 12 performs decryption. In this way, the cooperation system of the above embodiment solves the problem in the prior art that the fixed hardware secure unit based on computer or other device cannot be moved easily and some machine must be specified, causing inconvenience in mobile usage. Further, in the cooperation method, the security solution based on a fixed hardware secure unit 12 can be combined with a mobile hardware secure unit 11 securing a user's identity, thereby improving security of data transmission.

Figure 5:
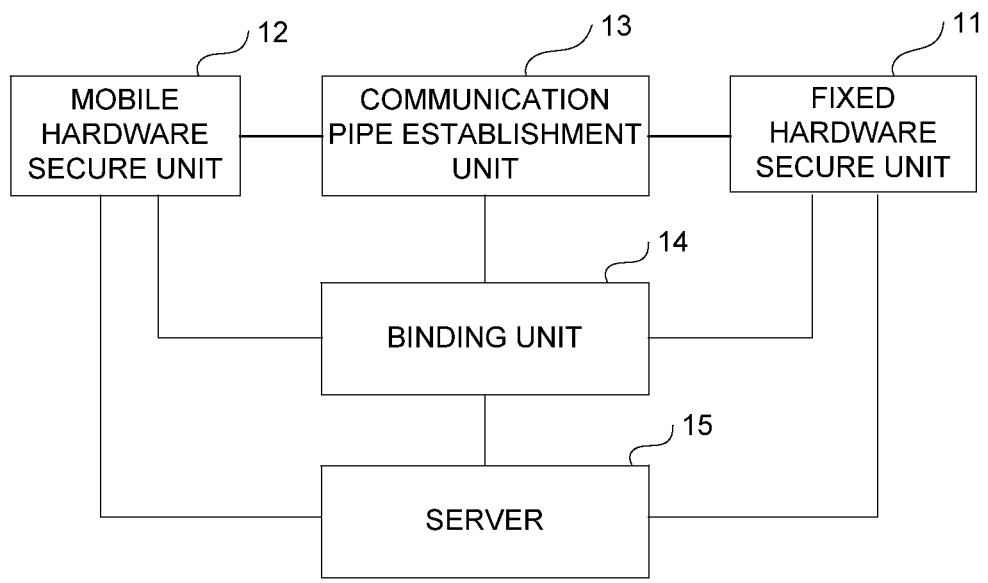
FIG. 5 is a flowchart of the second embodiment of the cooperation system in the present invention.

FIG. 5 is a flowchart of the second embodiment of the cooperation system in the present invention.

Compared with the above first embodiment, the second embodiment of the cooperation system is additionally provided with a server 15.

The second embodiment of the cooperation system in the present invention comprises a server 15, a mobile hardware secure unit 11, a fixed hardware secure unit 12, a communication pipe establishment unit 13 and a binding unit 14.

The mobile hardware secure unit 11 is used for representing a user's identity.

The fixed hardware secure unit 12 is a computer-based or other-device-based fixed hardware secure unit representing the identity of the platform.

The communication pipe establishment unit 13 establishes a communication pipe between the mobile and fixed hardware secure units 11, 12 by means of key negotiation or public key exchange.

The binding unit 14 binds the mobile hardware secure unit 11 and the fixed hardware secure unit 12 together through interaction of unique identification information of the two parties.

The server 15 is in communication with each of the mobile and the fixed hardware secure units 11, 12 and the binding unit 14. After establishing the binding relationship between the mobile and fixed hardware secure units 11, 12, the server 15 provides registration for the mobile and fixed hardware secure units 11, 12.

After the binding unit 14 binds the mobile hardware secure unit 11 and the fixed hardware secure unit 12 together, the mobile and fixed hardware secure units 11, 12 submit their relevant information or keys to the server 15 at the same time.

The relevant information can be any information that enables the server 15 to accurately identify the hardware secure units. For example, the identity information can be simply a public key used for signature verification or binding identification information or collection of these pieces of information.

When the user needs to present its identity to the server 15, the mobile and fixed hardware secure units 11, 12 are required to sign together under the binding relationship and present the identities of the platform and the user at the same time. Any of the two presentations is indispensible; otherwise, the server 15 will reject any service.

While sending a service request to the server 15 under the binding relationship, the mobile and fixed hardware secure units 11, 12 need to sign together under the binding relationship so as to present the identities of the platform and the user at the same time.

When the user submits to the server 15 his or her data such as "transfer XX dollars to XX account", the information must be signed with the electronic certificate of the mobile hardware secure unit 11 like USB Key. Also, the fixed hardware secure unit 12, such as TPM (Trusted Platform Module) on a computer, is needed for electronic certificate authentication or signature. After the signing of both of the mobile and fixed hardware secure units 11, 12, the data is then transmitted to the server 15.

The mobile and fixed hardware secure units 11, 12 can perform a secondary encryption on content to be transmitted to the server 15.

The mobile and fixed hardware secure units 11, 12 can perform the secondary encryption on plaintext to be transmitted to the server 15.

The mobile and fixed hardware secure units 11, 12 can perform secondary signing on the signature which represents identity information and is to be transmitted to the server 15.

In the case of asymmetrical key, the mobile and fixed hardware secure units 11, 12 can perform second public key encryption on plaintext to be transmitted to the server 15. The mobile and fixed hardware secure units 11, 12 can perform second private key encryption on the signature which represents identity information and is to be transmitted to the server 15.

Important data like electronic certificate must be encrypted and decrypted twice by the mobile and fixed hardware secure units 11, 12 under the condition of a binding between the two parties. Alternatively, each of the mobile and fixed hardware secure units 11, 12 can encrypt some data individually and unrepeated, so as to complete the encryption for security enhancement.

The important data can be set or determined according to applications or as needed by the user.

The encryption and decryption keys for the important data should not be moved between the two parties 11, 12 in a binding relationship to further guarantee data security. On the other hand, these keys can be encrypted and then moved or stored. Keys other than the encryption and decryption keys for the important data can be moved and backed-up between the mobile and fixed hardware secure units 11, 12.

A flag bit, such as "No" or "Yes", can be provided on a key to denote whether the key can be moved. The flag bit "No" on the key denotes immovability, and the flag bit "Yes" denotes movability.

The attribute of a key can be set by a creator (user or upper-level application) at the time of creation. If necessary, the attribute can be changed as needed.

In the cooperation system of the mobile and fixed hardware secure units of the above embodiment, a communication pipe is established by the communication pipe establishment unit 13 between the mobile and fixed hardware secure units 11, 12 to enable secure file transmission between the mobile and fixed hardware secure units 11, 12. Also, the mobile and fixed hardware secure units 11, 12 are bound with each other by the binding unit 14. After the creation of such binding relationship, the mobile and fixed hardware secure units 11, 12 each register to the server 15 and submit their identity information or key, respectively. and if data is sent to the server 15 after the binding of the mobile and fixed hardware secure units, the data can be obtained only after both the mobile and fixed hardware secure units 11, 12 performs decryption, thereby improving security of data transmission.

The present invention provides a computer device, of which the security solution based on a fixed hardware secure unit can be combined with a mobile hardware secure unit securing a user's identity.

The computer device of the present invention comprises a fixed hardware secure unit firmed inside the computer. The fixed hardware secure unit is loaded with a plat certificate and used to represent the platform's identity.

A bi-directional communication pipe is established between the fixed hardware secure unit and a mobile hardware secure unit representing a user's identity. The mobile hardware secure unit and the fixed hardware secure unit are bound with each other through interaction of unique identification information.

The mobile and fixed hardware secure units can establish the bi-directional communication pipe by means of key negotiation or public key exchange. For details of the establishment process, please refer to the above description.

The bi-directional communication pipe can be updated or abolished by any one of the mobile and fixed hardware secure units or by the two units together.

The bi-directional communication pipe can be updated or abolished by the mobile and/or fixed hardware secure units under some predetermined condition.

Specifically, the interaction of unique identification information comprises: the unique identification information of the mobile hardware secure unit is sent to the fixed hardware secure unit, which in turn recognizes and records the unique identification information; meanwhile, the unique identification information of the fixed hardware secure unit is sent to the mobile hardware secure unit, which in turn recognizes and records the unique identification information.

The interaction of unique identification information can be performed between the mobile hardware secure unit and the fixed hardware secure unit after the information undergoes cryptography processing.

In the computer system of the present invention, a communication pipe is established between the fixed hardware secure unit firmed inside the computer device and the mobile hardware secure unit representing the user's identity to enable secure file transmission between the mobile and fixed hardware secure units. Also, the mobile and fixed hardware secure units are bound with each other, and if data is sent to a third party after the binding of the mobile and fixed hardware secure units, the data can be obtained only after both the mobile and fixed hardware secure units performs decryption. In this way, the cooperation method of the above embodiment solves the problem in the prior art that the fixed hardware secure unit based on computer or other device cannot be moved easily and some machine must be specified, causing inconvenience in mobile usage. Further, in the computer system of the present invention, the security solution based on the fixed hardware secure unit can be combined with the mobile hardware secure unit securing a user's identity, thereby improving security of data transmission.

The foregoing description is only the preferred embodiments of the present invention and not intended to limit the present invention. Those ordinarily skilled in the art will appreciate that any modification or substitution in the principle of the present invention shall fall into the scope of the present invention defined by the appended claims.

What is claimed is:

1. A cooperation method of a mobile hardware secure unit and a fixed hardware secure unit, comprising:
providing user's identification information by the mobile hardware secure unit;
providing platform's identification information by the fixed hardware secure unit;
establishing a bidirectional communication pipe between the mobile and fixed hardware secure units by means of key negotiation or public key exchange; and
binding the mobile and fixed hardware secure units through interaction of the user's identification information and the platform's identification information over the established bidirectional communication pipe, wherein the interaction comprises sending the user's identification information provided by the mobile hardware secure unit to the fixed hardware secure unit which in turn recognizes and records the user's identification information, and sending the platform's identification information provided by the fixed hardware secure unit to the mobile hardware secure unit which in turn recognizes and records the platform's identification information; and
registering by each of the mobile and fixed hardware secure units to a server, which confirms the binding relationship between the mobile and fixed hardware secure units;
wherein the interaction is performed after the user's identification information provided by the mobile hardware secure unit and/or the platform's identification information provided by the fixed hardware secure unit undergoes cryptography processing, and wherein while sending a service request to the server, the mobile and fixed hardware secure units each sign under the binding relationship to present the platform's identification information and the user's identification information at the same time.

2. The cooperation method of claim 1, wherein the bi-directional communication pipe is updated or abolished by the mobile and/or fixed hardware secure units.

3. The cooperation method of claim 1, wherein the registration of the mobile and fixed hardware secure units to the server comprises:
the mobile hardware secure unit packing information to be registered with the server and transmitting it to the fixed hardware secure unit;
the fixed hardware secure unit packing its own registration information together with the packed registration information of the mobile hardware secure unit, and transmitting the packed information to the server.

4. The cooperation method of claim 1, wherein the registration of the mobile and fixed hardware secure units to the server comprises:
the mobile hardware secure unit packing information to be registered with the server and transmitting it to the server;
the fixed hardware secure unit packing its own registration information and the user's identification information of the mobile hardware secure unit together and transmitting the packed information to the server.

5. A cooperation system of a mobile hardware secure unit and a fixed hardware secure unit, comprising a mobile hardware secure unit, a fixed hardware secure unit, a communication pipe establishment unit and a binding unit and a processing unit, wherein
the mobile hardware secure unit is configured to provide a user's identity;
the fixed hardware secure unit is configured to provide a platform's identity;
the communication pipe establishment unit is configured to establish a bidirectional communication pipe between the mobile and fixed hardware secure units by means of key negotiation or public key exchange;
the processing unit is configured to perform cryptography processing on the user's identity provided by the mobile hardware secure unit and/or the platform's identity provided by the fixed hardware secure unit and
the binding unit is configured to bind the mobile and fixed hardware secure units together through interaction of the user's identity and the platform's identity over the established bidirectional communication pipe, wherein the interaction comprises sending the user's identity provided by the mobile hardware secure unit to the fixed hardware secure unit which in turn recognizes and records the user's identity, and sending the platform's identity provided by the fixed hardware secure unit to the mobile hardware secure unit which in turn recognizes and records the platform's identity;
wherein each of the mobile and fixed hardware secure units registers with a server, which confirms the binding relationship between the mobile and fixed hardware secure units, and wherein while sending a service request to the server, the mobile and fixed hardware secure units each sign under the binding relationship to present the platform's identity and the user's identity at the same time.

6. The cooperation system of claim 5, further comprising a condition setting unit and/or an update unit and/or an abolishment unit,
wherein the condition setting unit is configured to set a condition for updating or abolishing the bidirectional communication pipe;
the update unit is configured to update the bidirectional communication pipe or updating the bidirectional communication pipe according to the condition set by the condition setting unit; and
the abolishment unit is configured to abolish the bidirectional communication pipe or abolishing the bidirectional communication pipe according to the condition set by the condition setting unit.

7. A computer device comprising a fixed hardware secure unit and a processing unit, the fixed hardware secure unit is loaded with a platform certificate for providing a platform's identity, wherein:
a bidirectional communication pipe is established between the fixed hardware secure unit and a mobile hardware secure unit to provide a user's identity by means of key negotiation or public key exchange;
the processing unit is configured to perform cryptography processing on the user's identity provided by the mobile hardware secure unit and/or the platform's identity provided by the fixed hardware secure unit; and
the mobile and fixed hardware secure units are bound together through interaction of the user's identity and the platform's identity over the established bidirectional communication pipe, wherein the interaction comprises sending the user's identity provided by the mobile hardware secure unit to the fixed hardware secure unit which in turn recognizes and records the user's identity, and sending the platform's identity provided by the fixed hardware secure unit to the mobile hardware secure unit which in turn recognizes and records the platform's identity wherein each of the mobile and fixed hardware secure units registers with a server, which confirms the binding relationship between the mobile and fixed hardware secure units, and wherein while sending a service request to the server, the mobile and fixed hardware secure units each sign under the binding relationship to present the platform's identity and the user's identity at the same time.

8. The computer device of claim 7, further comprising a condition setting unit and/or an update unit and/or an abolishment unit, wherein the condition setting unit is configured to set a condition for updating or abolishing the bidirectional communication pipe;

the update unit is configured to update the bidirectional communication pipe or updating the bidirectional communication pipe according to the condition set by the condition setting unit; and the abolishment unit is configured to abolish the bidirectional communication pipe or abolishing the bidirectional communication pipe according to the condition set by the condition setting unit.

* * * * *